United States Patent [19]

Clark, Jr.

[11] Patent Number: 6,062,619
[45] Date of Patent: May 16, 2000

[54] AUXILIARY HANDLE ASSEMBLY FOR A LIFTING TOOL

[75] Inventor: Franklin T. Clark, Jr., Girard, Pa.

[73] Assignee: EMSCO, Inc., Girard, Pa.

[21] Appl. No.: 09/326,286

[22] Filed: Jun. 7, 1999

[51] Int. Cl.⁷ .............................. B25G 3/38; A01B 1/22
[52] U.S. Cl. ........................ 294/58; 294/54.5; 16/426
[58] Field of Search ............................. 294/49, 54.5, 57, 294/58, 59; 16/422, 426; 15/145; 43/21.2, 22, 25

[56] References Cited

U.S. PATENT DOCUMENTS

| | | | |
|---|---|---|---|
| 3,372,509 | 3/1968 | Arsenault | 294/58 |
| 3,410,016 | 11/1968 | Arsenault | 43/21.2 |
| 5,133,582 | 7/1992 | Rocha | 294/58 |
| 5,447,349 | 9/1995 | Coble | 294/58 |
| 5,799,996 | 9/1998 | Fredrickson | 294/58 |
| 5,871,246 | 2/1999 | Simdon | 294/58 |

*Primary Examiner*—Dean J. Kramer
*Attorney, Agent, or Firm*—Richard K. Thomson

[57] ABSTRACT

An auxiliary handle assembly useful with load-lifting hand tools. The assembly includes a cylindrical sleeve with an external thread, the sleeve being received over the end of the primary handle before its operating member is attached thereto. An auxiliary handle is connected to the sleeve by an attachment nut which has a single turn thread which engages the external thread of the sleeve. The sleeve and primary handle turn freely relative to the attachment nut to permit dumping of the load carried by operating member. The load application point of the auxiliary handle can be moved up and down the primary handle by relative rotation between the attachment nut and the sleeve to optimize the lifting capabilities of the modified tool for a particular user.

20 Claims, 3 Drawing Sheets

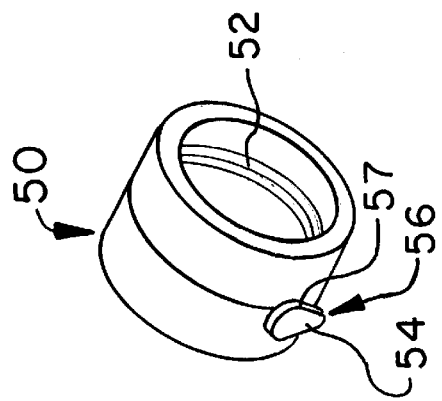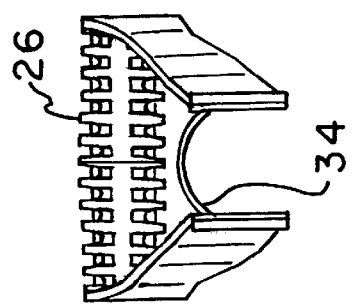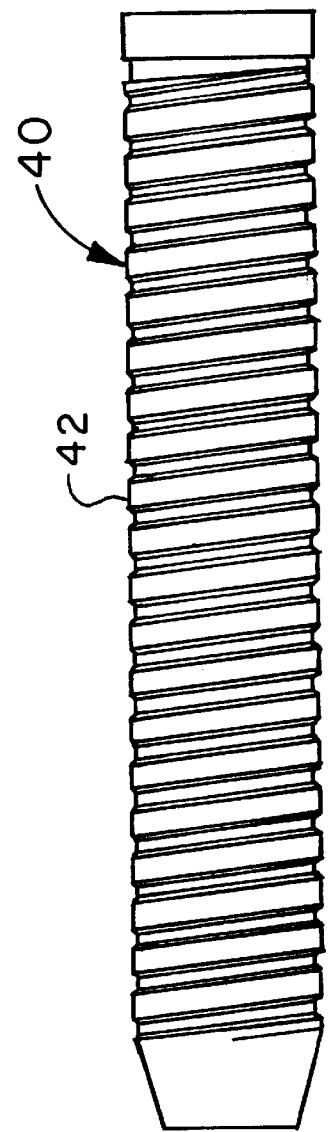

AUXILIARY HANDLE ASSEMBLY FOR A LIFTING TOOL

BACKGROUND AND SUMMARY OF THE INVENTION

The present invention is directed to improvements in hand tools. More particularly, the present invention is directed to an auxiliary handle which can be attached to a snow shovel, a garden shovel, a coal shovel or a rake to facilitate lifting of the load, transferring the load to an alternate location and dumping it.

The use of hand tools for moving loads such as snow, earth, and the like, can require extreme physical exertion. The use of these devices frequently involves repeated stooping, bending and lifting which can aggravate back muscles, as well as other muscle groups. The use of conventional shovels invites improper lifting with the back rather than use of the legs and arms.

A number of previous patents have attempted to address this problem by the addition of an auxiliary handle for assisting in the movement of the load. One such device is taught in U.S. Pat. No. 5,133,582 issued to Rocha. Rocha teaches the use of such an auxiliary handle which has a first end with a grip and a second end attached to a bushing which is captured between two pins which extend through the primary handle. One problem with the Rocha design is that it uses a "one size fits all" approach. In reality, each user is a different height with a different reach. One size does not fit all so the best the tool designer can do is to design the auxiliary handle to be usable by the "average" user and varying degrees of uncomfortable for anyone not falling in the "average user" category.

It is the purpose of the present invention to provide an auxiliary handle assembly which can be attached to snow shovels, coal shovels, garden shovels and rakes which will facilitate the lifting and dumping of loads and lead to improved posture involving use of arm and leg muscles rather than one's back. The secondary handle of the present invention is attached to the primary handle using a cylindrical sleeve which may be mounted on the primary handle adjacent one end thereof, said cylindrical sleeve having a helical groove formed on an external surface portion thereof. An adjustment nut encircles the cylindrical sleeve and a second opposite end of said secondary handle is attached thereto. Rotation of the primary handle and sleeve relative to the secondary handle and the adjustment nut results in longitudinal adjustment of a connection point between the secondary handle and the primary handle up and down the primary handle. This will be a relatively small distance during normal use of the tool equipped with the auxiliary attachment. The distance the sleeve could vary the connection point will depend on the length of the sleeve but, as an example, the sleeve could permit movement of the lifting point over a 10–12 inch length. This will accommodate different sized users and provide the optimum leverage for each user.

A clamp which is integral with the grip of the auxiliary handle allows the auxiliary handle to be secured to the primary handle during storage of the tool. A camming nut is used to secure the auxiliary handle to the adjustment nut, the insertion of the primary handle through the adjustment nut preventing the auxiliary handle being rotated to a position where it could be disengaged from the camming nut.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which

FIG. 3 is a side view of the auxiliary handle of the first embodiment of the present invention;

FIG. 5 is a side view of the externally threaded sleeve of the first embodiment of the auxiliary handle of the present invention; and, FIG. 6 is a perspective view of the attachment nut of the present invention.

DETAILED DESCRIPTION OF PREFERRED EMBODIMENT(S)

Figure 1:
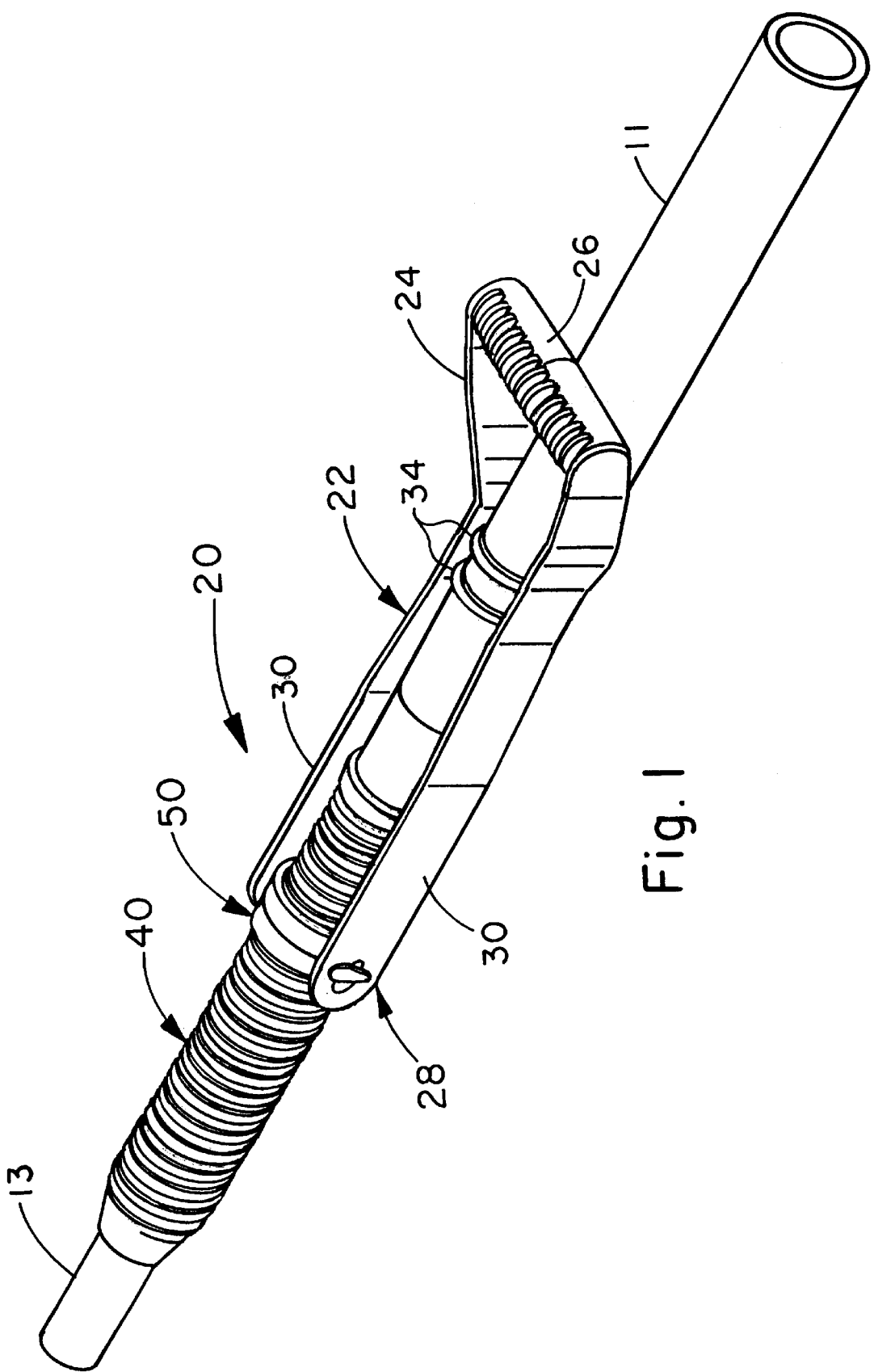
FIG. 1 is a perspective view of a first embodiment of the auxiliary handle assembly of the present invention.
Figure 2:
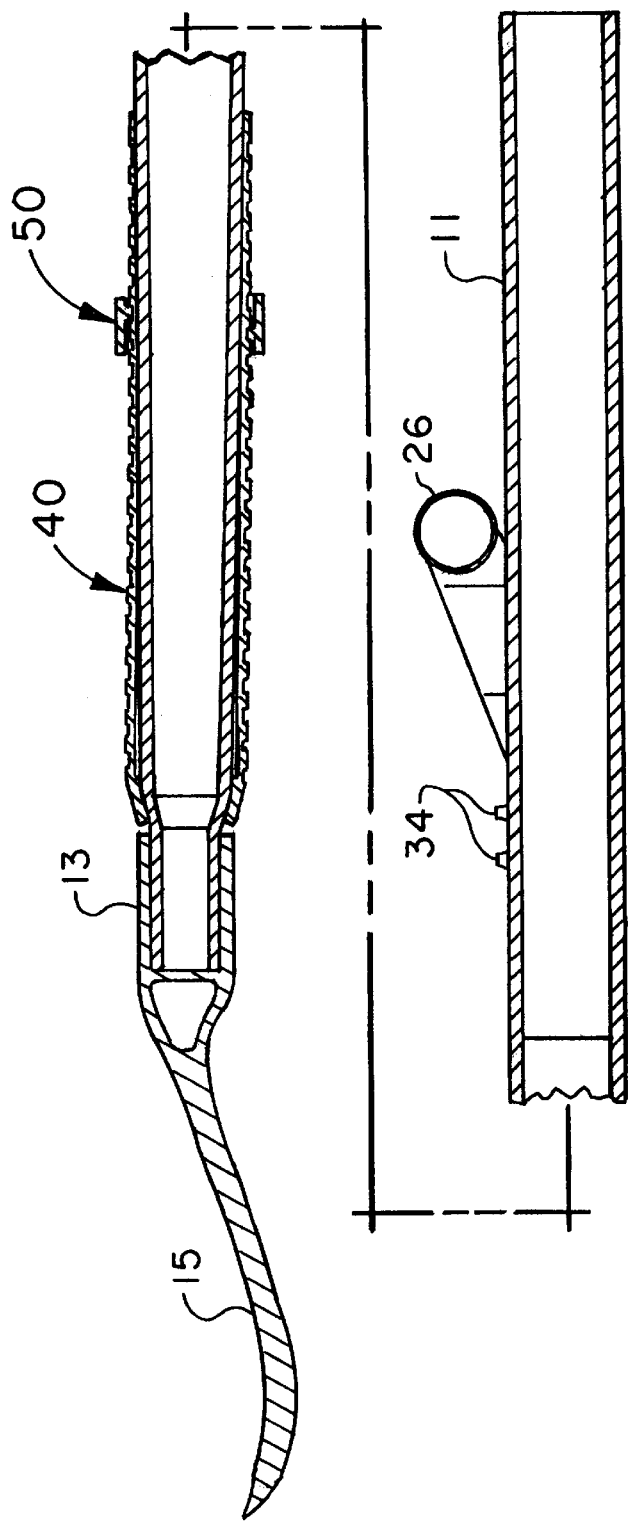
FIG. 2 is a cross-sectional side view of the first embodiment of the auxiliary handle of the present invention.
Figure 4:
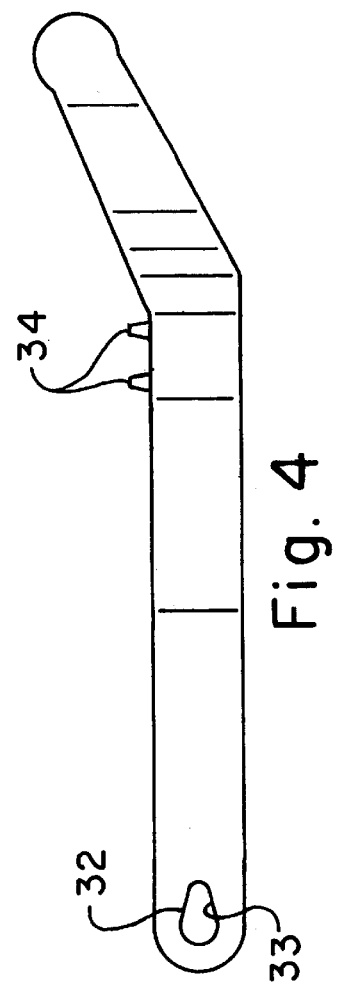
FIG. 4 is an end view of the auxiliary handle of the first embodiment of the present invention.

The auxiliary handle assembly of the present invention is shown in FIGS. 1 and 2 generally at 20. Auxiliary handle assembly 20 can be used with any hand tool used for lifting, transporting and dumping a load such as a snow shovel, a coal shovel, a garden shovel or garden rake, for example. Auxiliary handle assembly 20 comprises an auxiliary handle 22, an externally threaded sleeve 40 and an attachment nut 50. Auxiliary handle 22 has a length which is less than the primary handle 11 with which it shall be used, generally about half the length of primary handle 11. Auxiliary handle 22 has a first end 24 with a grip 26 and a second end 28 defined by a pair of arms 30. Each of the arms 30 has a shaped opening 32 (FIG. 3) adjacent its terminus for reasons to be discussed here after. Auxiliary handle 22 has a clamp means 34 which may be generally semi-annular (FIG. 3) formed near the grip 26. Clamp means 34 can clasp primary handle 11 and secure auxiliary handle 22 in a storage position in which auxiliary handle 22 runs generally parallel to and sits atop primary handle 11.

Auxiliary handle assembly 22 further comprises externally threaded sleeve 40 which has a robust thread 42 extending over most of its length (see FIG. 5). Sleeve 40 is preferably has a length of about a foot and is slipped onto end 13 of primary handle 11 prior to attachment of the business end 15 of the tool. End 15 is depicted in FIG. 2 as a snow shovel blade. Since sleeve 40 is simply captured on primary handle 11, it is free to rotate thereabout. Attachment nut 50 has a single turn of an internal thread 52. Internal thread 52 has a robust thread design which is compatable with that of thread 42 on sleeve 40. A pair of ears 54 extend outwardly from attachment nut 50, ears 54 having generally the same shape as shaped openings 32. Ears 54 define a camming nut 56. To assemble openings 32 of arms 30 onto ears 54, attachment nut 50 is first threaded onto sleeve 40 and then, the auxiliary handle 22 must be turned about 90° to the axis of sleeve (downwardly in FIG. 2) to get shaped openings 32 to line up with complementarily shaped ears 54. Once auxiliary handle 22 is pivoted upwardly and primary handle 11 inserted into sleeve 40, arms 30 are captured on ears 54 as the peripheries 33 of openings 32 are locked into slots 57 on camming nut 56. All parts of the auxiliary handle assembly are preferably molded from a rigid, durable plastic such as polypropylene or polyethylene.

In use, clamp means 34 will be disengaged and auxiliary handle 22 will be pivoted outwardly from the axis of primary handle 11 through an angle of between about 10 and 90° depending on the preference of the user. The primary handle 11 will be used to place the business end 15 of the hand tool under the load to be lifted. The user may use her/his primary hand (right or left depending on her/his tendencies) to either grip the handle grip of the primary handle 11 or use her/his primary hand to provide lifting force on the secondary or auxiliary handle 22. It is believed that most users will desire to use their preferred hand (which is normally their strongest) on the auxiliary handle grip 26 to lift the load. By rotating the auxiliary handle 22 relative to sleeve 40, adjustment nut 50 will move up or down the primary handle 11 to provide the most comfortable lifting force application point for a particular user. In normal use of the conventional configuration, the sleeve will generally rotate with the primary handle 11 due to the larger surface area shared by those members than by the single turn thread 52 and thread 42. However, in an alternative configuration in which the interference between threads 42 and 52 is increased, the sleeve could be made to rotate with the adjustment nut 50 unless the user held sleeve 40 to intentionally effect translation of the force application point. As the load is lifted, the primary handle can be rotated relative to attachment nut 50 and the transfered load will be dumped from the support surface of the shovel or rake. This small, 180° rotation of sleeve 40 relative to adjustment nut 50 will result in minimal longitudinal translation of the lifting point of auxiliary handle 22 (approximately ¼") and turning the support surface right side up will restore the lifting point to its originally adjusted position. The total length of the sleeve 40 can vary but will normally preferably be of a length to permit translation of the force application point over a distance of between 10 and 12 inches. This is sufficient to enable appropriate adjustment for all potential useres.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. An auxiliary handle assembly for use with a tool having a primary handle for assisting in transferring a load, said auxiliary handle assembly comprising:
   a) an auxiliary handle having a length which is less than a length of the primary handle, said auxiliary handle having a first end with a grip and a second opposite end;
   b) a cylindrical sleeve which may be mounted on the primary handle adjacent one end thereof, said cylindrical sleeve having a helical groove formed on an external surface portion thereof;
   c) an adjustment nut encircling said cylindrical sleeve, said second opposite end of said auxiliary handle being attached to said adjustment nut;
   d) means to pivotally connect said second opposite end of said auxiliary handle to said adjustment nut;
   whereby when said adjustment nut is rotated relative to said cylindrical sleeve, a connection point of said auxiliary handle to the primary handle is longitudinally adjusted up and down the primary handle to accommodate a particular user of said tool.

2. The auxiliary handle assembly of claim 1 wherein said auxiliary handle further comprises clamp means to secure said auxiliary handle to the primary handle in a storage position.

3. The auxiliary handle assembly of claim 1 wherein said adjustment nut has an internal thread which traverses a single circumferential revolution of said adjustment nut.

4. The auxiliary handle assembly of claim 3 wherein said adjustment nut has two ears protruding in opposite lateral directions, said second opposite end of said auxiliary handle being defined by two arms, each said arm having a shaped opening which engages one of said ears.

5. The auxiliary handle assembly of claim 4 wherein each of said ears has a camming surface which is received in one of said shaped openings in each one of said two arms.

6. The auxiliary handle assembly of claim 5 wherein said camming surfaces and said shaped openings are configured such that assembly of said two arms of said auxiliary handle onto said ears of said adjustment nut occurs when said auxiliary handle is in a rearwardly tilted position with respect to a longitudinal axis of said adjustment nut.

7. The auxiliary handle assembly of claim 6 wherein the primary handle prevents said auxiliary handle from achieving said rearwardly tilted position once it has been inserted into said cylindrical sleeve whereby said shaped openings of said auxiliary handle are captured on said ears.

8. The auxiliary handle assembly of claim 7 wherein the tool with which said auxiliary handle assembly is used is selected from the group consisting of a snow shovel, a garden shovel, a coal shovel and a rake.

9. The auxiliary handle assembly of claim 8 wherein the tool with which said auxiliary handle assembly is used is a snow shovel.

10. The auxiliary handle assembly of claim 8 wherein said cylindrical sleeve is slipped over a second end of the primary handle and a blade attached thereto to capture said sleeve on the primary handle.

11. A snow shovel comprising
   a. a primary handle having a first end with a grip thereon and a second end to which a blade is connected and a first length extending between said first and said second ends;
   b. a secondary handle having a second length which is less than said first length of said primary handle, said secondary handle having a first end with a grip and a second opposite end;
   c. a cylindrical sleeve mounted on said primary handle adjacent said second end thereof, said cylindrical sleeve having a helical groove formed on an external surface portion thereof;
   d. an adjustment nut encircling said cylindrical sleeve, said second opposite end of said secondary handle being attached to said adjustment nut;
   whereby when said adjustment nut is rotated relative to said cylindrical sleeve, a connection point of said secondary handle to the primary handle is longitudinally adjusted up and down the primary handle to accommodate a particular user of said snow shovel.

12. An auxiliary handle assembly for use with a tool having a primary handle for assisting in transferring a load, said auxiliary handle assembly comprising:
   a) an auxiliary handle having a length which is less than a length of the primary handle, said auxiliary handle having a first end with a grip and a second opposite end;
   b) a cylindrical sleeve which may be mounted on the primary handle adjacent one end thereof, said cylindrical sleeve having a helical groove formed on an external surface portion thereof;
   c) clamp means to secure said auxiliary handle to the primary handle in a storage position;
   d) an adjustment nut encircling said cylindrical sleeve, said second opposite end of said auxiliary handle being attached to said adjustment nut;

whereby when said adjustment nut is rotated relative to said cylindrical sleeve, a connection point of said auxiliary handle to the primary handle is longitudinally adjusted up and down the primary handle to accommodate a particular user of said tool.

13. The auxiliary handle assembly of claim 12 wherein said adjustment nut has an internal thread which traverses a single circumferential revolution of said adjustment nut.

14. The auxiliary handle assembly of claim 13 wherein said adjustment nut has two ears protruding in opposite lateral directions, said second opposite end of said auxiliary handle being defined by two arms, each said arm having a shaped opening which engages one of said ears.

15. The auxiliary handle assembly of claim 14 wherein each of said ears has a camming surface which is received in one of said shaped openings in each one of said two arms.

16. The auxiliary handle assembly of claim 15 wherein said camming surfaces and said shaped openings are configured such that assembly of said two arms of said auxiliary handle onto said ears of said adjustment nut occurs when said auxiliary handle is in a rearwardly tilted position with respect to a longitudinal axis of said adjustment nut.

17. The auxiliary handle assembly of claim 16 wherein the primary handle prevents said auxiliary handle from achieving said rearwardly tilted position once it has been inserted into said cylindrical sleeve whereby said shaped openings of said auxiliary handle are captured on said ears.

18. The auxiliary handle assembly of claim 17 wherein the tool with which said auxiliary handle assembly is used is selected from the group consisting of a snow shovel, a garden shovel, a coal shovel and a rake.

19. The auxiliary handle assembly of claim 18 wherein the tool with which said auxiliary handle assembly is used is a snow shovel.

20. The auxiliary handle assembly of claim 18 wherein said cylindrical sleeve is slipped over a second end of the primary handle and a blade attached thereto to capture said sleeve on the primary handle.

* * * * *